(No Model.)
F. M. KIMES.
COTTON PLANTER.
No. 243,920. Patented July 5, 1881.
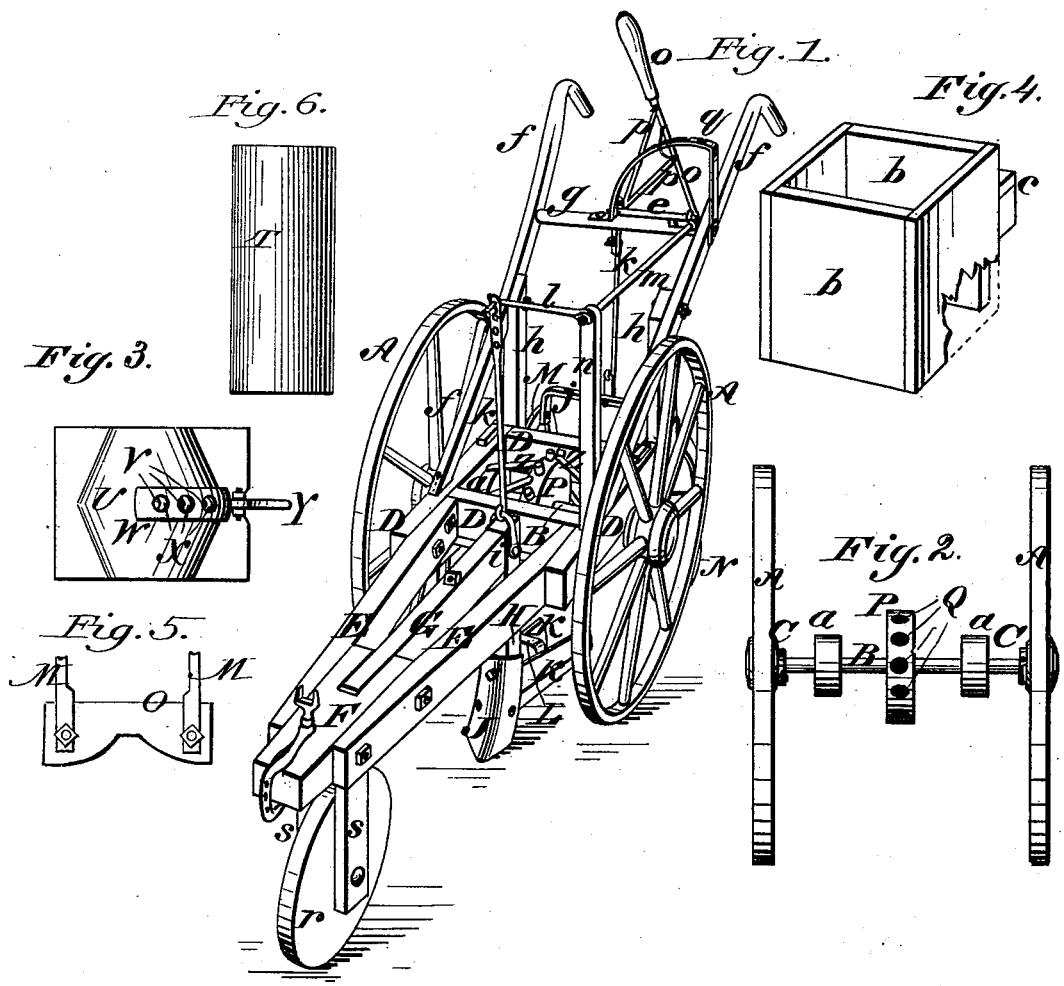

UNITED STATES PATENT OFFICE.

FRANCIS M. KIMES, OF VAN BUREN, ARKANSAS.

COTTON-PLANTER.

SPECIFICATION forming part of Letters Patent No. 243,920, dated July 5, 1881.

Application filed November 4, 1880. (No model.)

*To all whom it may concern:*

Be it known that I, FRANCIS MARION KIMES, of Van Buren, in the county of Crawford and State of Arkansas, have invented a new and useful Improvement in Cotton-Planters, of which the following is a specification.

Figure 1 is a perspective view of the improvement arranged as a cotton-planter, the seed-box being removed. Fig. 2 represents the wheels, axle, and planting-wheel. Fig. 3 is a bottom view of the cotton-planting shell. Fig. 4 is a perspective view of the cotton-planter seed-box. Fig. 5 represents the cotton-seed coverer. Fig. 6 represents one of the cotton-seed feed-pins.

The object of this invention is to furnish planters so constructed that they can be easily and quickly adjusted for planting cotton-seed, and which shall be convenient in use and reliable in operation in either capacity.

Similar letters of reference indicate corresponding parts.

A are the drive-wheels, which are connected with the axle B by ratchet-wheels and pawls C, so that the wheels A will carry the axle B with them in their revolution when the planter is drawn forward, but can be turned back without turning the said axle for convenience in turning and backing the planter. The axle B revolves in bearings attached to the side bars of the rectangular frame D, which is formed by connecting two side bars at their rear ends and at a little distance from their forward ends by two cross-bars.

To the projecting forward ends of the side bars of the frame D are attached the rear ends of the two bars E, which incline toward each other, and to and between their forward ends is secured a block, F. To the forward end of the block F is attached a clevis to receive the draft, and to its rear end is hinged the forward end of a plow-beam, G.

To the rear end of the beam G is attached the upper end of a standard, H, the draft-strain upon which is sustained by a brace-rod, I.

To the lower end of the standard H is attached a plow, J, to open a furrow to receive the seed.

To the lower end of the standard H are also attached the forward ends of two bars or plates, K, which incline from each other, are held in position by a connecting cross-bar, L, and are designed to press back the soil and keep the furrow opened, and at the same time serve as guides to conduct the seed into the furrow and as guards to prevent the seed from being blown away by the wind.

To the forward parts of the side bars of the frame D are hinged, by bolts or other suitable means, the upwardly-curved forward ends of the plow-beams M, which beams pass back beneath the axle B, and their rear parts are curved downward to bring them into proper position to serve as standards, or have standards attached to them to receive the covering-plows N.

When the planter is used for planting cotton-seed the plows N are detached, and the covering-plate O is attached to the standards of the beams M. The lower side of the coverer O is concaved to give a proper form to the top of the row. To the center of the axle B is attached a wheel, P, in the rim of which are formed twelve (more or less) radial holes, Q. The holes Q are about three-fourths of an inch in diameter and an inch (more or less) in depth.

When the machine is to be used for planting cotton, a shell, U, is attached to the lower sides of the bars of the frame D. The shell U is made in the form of two halves of truncated cones, placed base to base and having flanges along the edges of the open side for convenience in securing the shell to the frame D. The shell U is made of such a size as to receive and fit close to the lower part of the planting-wheel P, so that the pins T will force the cotton-seeds out through the holes V in the middle part of the said shell U. Over the holes V of the shell U is placed a strap or plate, W, provided with holes X, corresponding in size, number, and position with the holes V, so that by adjusting the plate W the holes V can be wholly or partially uncovered, or wholly covered, to regulate and prevent the escape of seed, as required. The gage-plate W is provided with a handle or lever, Y, for convenience in adjusting it.

To the rim of the wheel P are attached the inner ends of a number of bars, Z, the outer ends of which are inclined forward and are attached to two small wheels, *a*, placed upon and secured to the axle B. With this construction, as the planter is drawn forward the bars Z agitate the seed and press it toward the discharge-openings, and the pins T push it out through the said openings. b is the seed-box, which is placed upon and secured to the frame D, directly over the shell U, which shell thus serves as a bottom to the said seed-box.

To one side of the seed-box b is attached a small box, c, to serve as a receptacle for the plugs and cups R S when the machine is used as a cotton-planter, and for the pins T and bars Z when the machine is used as a corn-planter.

To the forward part of the side bars of the frame D are attached the forward ends of the handles f, which are connected and held in proper relative positions by a round, g, and are held at the proper elevation by being attached to the upper ends of uprights h, the lower ends of which are attached to the rear corners of the said frame D.

To a clevis or other connection, i, attached to the upper end of the standard H, or to the rear end of the beam G and to the center of an arched bar, j, attached at its ends to the rear parts of the beams M, are pivoted the lower ends of the two rods k, which pass up vertically and are pivoted at their upper ends to the ends of two crank-arms, l, attached to or formed upon the ends of the rod m. The forward end of the rod m rocks in a bearing attached to the upper end of an upright, n, the lower end of which is attached to the forward part of a side bar of the frame D. The rear end of the rod m rocks in a bearing attached to the end part of the round g or to a handle, f.

To the rock-rod m is rigidly attached a lever, o, which is strengthened in place by one or more braces, p, attached to it and to the crank-arm l. With this construction the opening-plow and the coverers can be raised and lowered by operating the lever o. The lever o moves along a curved bar, q, one end of which is attached to the round g, and its other end is attached to the handle f, and which has notches formed in it to receive the lever o, or a pawl formed upon or attached to the said lever o, so as to hold the plows securely in any position into which they may be adjusted.

The forward part of the planter is supported by a wheel, r, which is pivoted to and between the lower ends of two standards, s. The upper ends of the standards s are attached to the forward part of the frame E F.

Having thus fully described my invention, I claim as new and desire to secure by Letters Patent—

In a cotton-planter, the combination, with the axle B, the shell U, and the planting-wheel P, of the inclined bars Z and the small wheels a, substantially as herein shown and described, whereby the seed is agitated and fed toward the discharge-holes of the shell, as set forth.

FRANCIS MARION KIMES.

Witnesses:
J. J. CLARK,
WM. L. TAYLOR.